United States Patent
Maghrebi et al.

(10) Patent No.: US 11,146,409 B2
(45) Date of Patent: Oct. 12, 2021

(54) PROCESS FOR CHALLENGE RESPONSE AUTHENTICATION OF A SECURE ELEMENT (SE) IN A MICRO CONTROLLER UNIT

(71) Applicant: IDEMIA IDENTITY & SECURITY FRANCE, Issy-les-Moulineaux (FR)

(72) Inventors: Houssem Maghrebi, Issy-les-Moulineaux (FR); Ahmadou Sere, Issy-les-Moulineaux (FR); David Daille-Lefevre, Issy-les-Moulineaux (FR); Deny Carhuel, Issy-les-Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 439 days.

(21) Appl. No.: 16/012,645

(22) Filed: Jun. 19, 2018

(65) Prior Publication Data
US 2019/0013946 A1    Jan. 10, 2019

(30) Foreign Application Priority Data
Jun. 20, 2017    (FR) ...................... 1755630

(51) Int. Cl.
*H04L 9/32*    (2006.01)
*H04L 29/06*    (2006.01)
*H04L 9/08*    (2006.01)

(52) U.S. Cl.
CPC .......... *H04L 9/3271* (2013.01); *H04L 9/0869* (2013.01); *H04L 9/3231* (2013.01); *H04L 63/0869* (2013.01)

(58) Field of Classification Search
CPC ... H04L 9/3231; H04L 9/0869; H04L 9/3271; H04L 9/3273
See application file for complete search history.

(56) References Cited

U.S. PATENT DOCUMENTS

| | | | |
|---|---|---|---|
| 10,057,054 B2 * | 8/2018 | Pebay-Peyroula | .... H04L 9/0869 |
| 2002/0034300 A1 * | 3/2002 | Thuvesholmen | ..... H04L 9/0643 380/256 |

(Continued)

OTHER PUBLICATIONS

Preliminary Research Report and Written Opinion received for French Application No. 1755630, dated Mar. 9, 2018, 10 pages (1 page of French Translation Cover Sheet and 9 pages of original document).

(Continued)

*Primary Examiner* — Kristine L Kincaid
*Assistant Examiner* — Alexander R Lapian
(74) *Attorney, Agent, or Firm* — Womble Bond Dickinson (US) LLP

(57) ABSTRACT

Challenge-response authentication process of a secure element (SE) in a micro controller unit (MCU) devoid of a random number generator. The process includes the following steps conducted by the micro controller unit (MCU): receipt of at least one random datum (T, IDX) generated randomly by the secure element (SE), generation of a challenge datum (Z) specific to the micro controller unit (MCU) from the received random datum (T, IDX), sending of the generated challenge datum (Z) to the secure element (SE), receipt of a response datum (R) generated by the secure element (SE) as a function of the challenge datum (Z), and determination of an authentication result as a function of the received response datum.

11 Claims, 4 Drawing Sheets

(56) References Cited

U.S. PATENT DOCUMENTS

| | | | | |
|---|---|---|---|---|
| 2006/0269066 | A1* | 11/2006 | Whitehead | H04L 9/3271 380/270 |
| 2009/0067629 | A1* | 3/2009 | Kraszewski | H04L 63/0428 380/251 |
| 2009/0315673 | A1* | 12/2009 | Huang | G06K 19/07309 340/5.61 |
| 2014/0040621 | A1* | 2/2014 | Klimke | H04W 12/0023 713/171 |
| 2015/0319152 | A1* | 11/2015 | Chastain | H04L 63/062 726/4 |
| 2016/0154967 | A1* | 6/2016 | Lee | G06F 21/6245 713/189 |
| 2016/0260087 | A1* | 9/2016 | Lee | H04L 63/102 |
| 2016/0295404 | A1* | 10/2016 | Gouget | H04L 63/126 |
| 2016/0309535 | A1* | 10/2016 | Myoung | H04W 72/0453 |
| 2017/0214662 | A1* | 7/2017 | Chu | H04L 63/0823 |
| 2018/0101677 | A1* | 4/2018 | Broumas | G06F 21/44 |
| 2018/0232971 | A1* | 8/2018 | Schieke | H04W 4/023 |

OTHER PUBLICATIONS

GlobalPlatform, "GlobalPlatform Card Technology—Secure Channel Protocol 03—Card Specification v 2.2 Amendment D, Version 1.0", Internet Citation, Apr. 2009, pp. 1-26, Available at URL:http://www.globalplatform.org/specificationscard.asp.

Chen, Lily, "NIST Special Publication 800-108 Recommendation for Key Derivation Using Pseudorandom Functions (Revised)", National Institute of Standards and Technology, Oct. 2009, pp. 1-21, Available at URL:http://csrc.nist.gov/publications/nistpubs/800-108/sp800-108.pdf.

Anonymous, "Recipients of this document Card Specification", Globalplatform Card Specification V2, Mar. 3, 2017, pp. 270-274.

* cited by examiner

PROCESS FOR CHALLENGE RESPONSE AUTHENTICATION OF A SECURE ELEMENT (SE) IN A MICRO CONTROLLER UNIT

FIELD OF THE INVENTION

The present invention relates to a challenge-response authentication process of a secure element (SE) in a micro controller unit (MCU).

This process applies advantageously for preparing to set up a secure communication channel between the secure element and the micro controller unit, used for example in terms of biometric authentication.

PRIOR ART

As is known, a secure element, is an inviolable material platform capable of fully securely receiving programs and storing confidential and cryptographic data.

In many applications, the secure element communicates with another device such as a micro controller unit via a communication channel.

To preserve the inviolable character of the secure element, it is required that this communication channel is secure itself.

A process known for setting up such a secure channel is to perform mutual authentication of the secure element and of the micro controller unit.

Such mutual authentication conventionally comprises two challenge-response authentications.

In a first challenge-response authentication, the micro controller unit is authenticated by the secure element. For this, the secure element generates a challenge datum which is distinctive to it and sends it to the micro controller unit; the micro controller unit generates a response datum on the challenge database it receives and sends the response datum to the secure element; the secure element then verifies whether the response datum it receives is equal or non to an expected datum, and if this is the case the first challenge-response authentication succeeds.

In a symmetric manner, in a second challenge-response authentication, the secure element is authenticated by the micro controller unit. For this, the micro controller unit generates a challenge datum which is distinctive to it and sends it to the secure element; the secure element generates a response datum on the challenge database it receives and sends the response datum to the micro controller unit; the micro controller unit then verifies whether the response datum it receives is equal or not to an expected datum, and if this is the case the second challenge-response authentication succeeds.

The secure channel is set up only if mutual authentication has succeeded, that is, if both symmetrical challenge-response authentications have succeeded.

It is essential that the two challenge data are generated respectively by the two entities present (the micro controller unit and the secure element), and this is random to confer an adequate level of security on the mutual authentication. These two constraints are especially required for executing protocols SCP02 and SCP03 defined by the GlobalPlatform association.

A simple way of respecting these constraints is to embed in each of the two entities present a random number generator ("random number generator" in English).

But the disadvantage of this solution is being minimally flexible and potentially costly due to the particular material configuration of the two entities which the two random number generators require.

SUMMARY OF THE INVENTION

An aim of the invention is to propose a challenge-response authentication process of a secure element in a micro controller unit utilisable in low-cost systems.

According to a first aspect of the invention, a challenge-response authentication process of a secure element in a micro controller unit devoid of a random number generator is therefore proposed, the process comprising the following steps conducted by the micro controller unit:
  receipt of at least one random datum generated randomly by the secure element,
  generation of a challenge datum specific to the micro controller unit from the received random datum,
  sending of the generated challenge datum to the secure element,
  receipt of a response datum generated by the secure element as a function of the challenge datum,
  determination of an authentication result as a function of the received response datum.

According to a second aspect of the invention, a challenge-response authentication process of a secure element in a micro controller unit devoid of a random number generator is also proposed, the process comprising the following steps conducted by the secure element:
  random generation of at least one random datum,
  sending of the random datum to the micro controller unit,
  receipt of a challenge datum specific to the micro controller unit and generated by the micro controller unit from the random datum sent,
  generation of a response datum depending on the received challenge datum,
  sending of the response datum to the micro controller unit in light of determination of an authentication result as a function of the response datum sent.

In processes according to the present invention, the challenge datum specific to the micro controller unit is not generated by means of a random number generator internal to the micro controller unit, but is generated by way of a random datum which is supplied by the secure element. Also, the fact of not incorporating a random number generator in the micro controller unit, now unnecessary due to this tip, reduces the manufacturing cost of the micro controller unit. Consequently, the challenge-response authentication process can be executed in a system whereof the overall cost is reduced.

Processes according to the first and second aspect of the invention can be completed by means of the following characteristics, taken singly or else in combination when this is technically possible.

The secure element can receive a set of random data during the receiving step of at least one random datum, and the generation of the challenge datum comprise sub-steps of:
  selection of two random data in the set of received random data,
  encryption of one of the two random datum by using the other of the two random data as encryption key so as to produce an encrypted random datum, the challenge datum depending on the encrypted random datum.

The set of random data can comprise a table and an index datum associated with the table, and one of the two random data can be part of the localised table according to the index datum. The other of the two random data can be part of the table complementary to the localised part according to the index datum.

Generation of the challenge datum can also comprise truncation of the encrypted random datum.

The secure element can verify the challenge datum which it receives, this verification comprising steps of:
generation by the secure element of another challenge datum from the generated random datum,
comparison between the received challenge datum by the secure element of the micro controller unit and of the other challenge datum generated by the secure element,
executing a security measure adapted so that the authentication result is negative when the two compared challenge data are different.

The secure element can be a smart card and/or the micro controller unit can be a transmission interface of biometric data previously acquired by a biometric sensor to the secure element.

According to a third aspect of the invention, a biometric authentication process is proposed, comprising the following steps:
challenge-response authentication of a secure element in a micro controller unit devoid of a random number generator by means of the process according to the first aspect or the second aspect of the invention,
authorisation, by the micro controller unit, for setting up a secure communication channel between the secure element and the micro controller unit, provided the result of the challenge-response authentication is positive,
transmission, by the micro controller unit to the secure element, of biometric data previously acquired by a biometric sensor via a secure channel set up.

According to a fourth aspect of the invention, a computer program product is also proposed, comprising program code instructions for execution of the steps of the process according to the first or the second aspect of the invention when this program is run by at least one processor.

According to a fifth aspect of the invention, a micro controller unit devoid of a random number generator and comprising a communication interface with a secure element is proposed, as well as at least one processor configured, during authentication of the secure element by challenge-response in the micro controller unit, to:
receive, via the communication interface, at least one generated random datum randomly by the secure element,
generate a challenge datum specific to the micro controller unit from the received random datum,
control sending by the communication interface of the generated challenge datum to the secure element,
receive, via the communication interface, a response datum generated by the secure element as a function of the challenge datum,
determine an authentication result as a function of the received response datum.

According to a sixth aspect of the invention, a secure element comprising a communication interface with a micro controller unit devoid of a random number generator is also proposed, the secure element comprising also at least one processor configured, during authentication of the secure element by challenge-response in the micro controller unit, to:
generate randomly at least one random datum,
control sending of the random datum to the micro controller unit MCU by the communication interface,
receive a challenge datum specific to the micro controller unit MCU and generated by the micro controller unit MCU from the random datum sent,
generate a response datum depending on the received challenge datum,
control sending by the communication interface (12) of the response datum to the micro controller unit in light of determining an authentication result as a function of the response datum sent.

According to a seventh aspect of the invention, a biometric authentication system comprising a micro controller unit according to the fifth aspect of the invention and a secure element according to the sixth aspect of the invention are also proposed, wherein the micro controller unit is also configured to:
authorise setting up a secure communication channel between the secure element and the micro controller unit, provided the result of the challenge-response authentication is positive,
transmit biometric data previously acquired by a biometric sensor to the secure element via the secure channel set up.

DESCRIPTION OF FIGURES

Other characteristics, aims and advantages of the invention will emerge from the following description which is purely illustrative and non-limiting and which must be considered in terms of the appended drawings, in which.

In all figures, the similar elements bear identical reference numerals.

DETAILED DESCRIPTION OF THE INVENTION

A/ Biometric Authentication System

Figure 1:
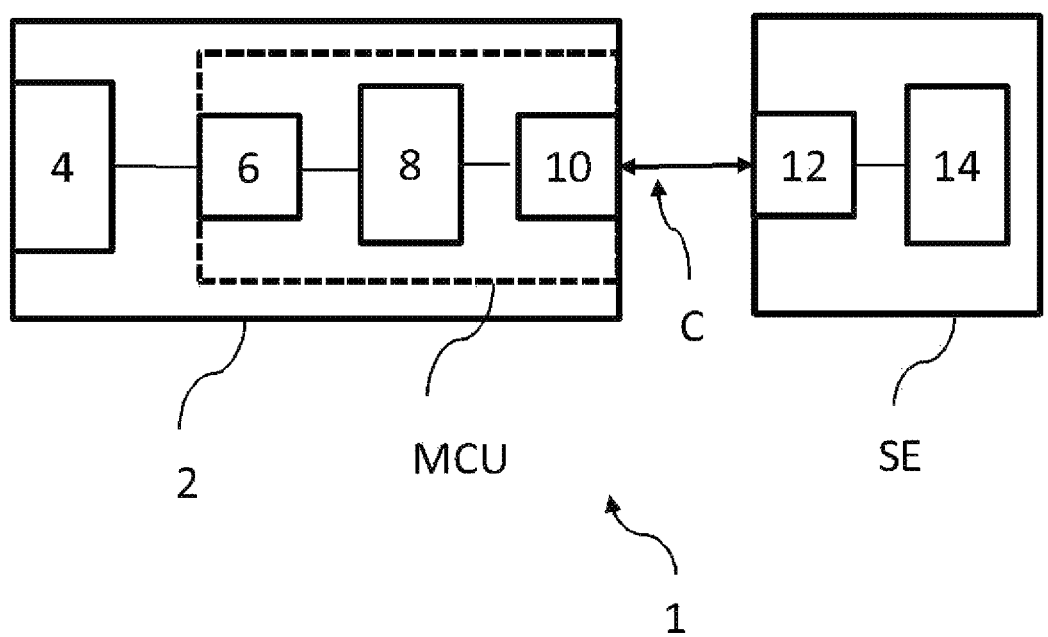
FIG. 1 schematically illustrates a biometric authentication system according to an embodiment of the invention.

In reference to FIG. 1, a biometric authentication system 1 comprises a terminal 2 and a secure element SE.

The terminal 2 comprises a biometric sensor 4 and a micro controller unit MCU.

The biometric sensor 4 is configured to acquire biometric data such as fingerprints.

The micro controller unit MCU comprises a communication interface 6 with the biometric sensor 4, at least one processor 8, and a communication interface 10 with the secure element SE.

However, the micro controller unit MCU has no internal random number generator. The micro controller unit MCU is not subject to the same security demands as the secure element SE, therefore the complexity and cost are much less than the latter.

The communication interface 6 with the biometric sensor 4 is for example a wired interface inside the terminal 2.

The communication interface 10 with the secure element SE is for example a wired or wireless interface. For example, the communication interface 10 with the secure element SE comprises a reader comprising a housing for receiving the secure element SE, such that the micro controller unit MCU and the secure element SE are placed in electrical contact.

Alternatively, the communication interface with the secure element SE comprises a Near Field Communication chip ("Near Field Communication", abbreviated as NFC in English).

Also, the secure element SE comprises a communication interface 12 with the micro controller unit MCU, and at least one processor 14 adapted to execute cryptographic processings. The aim of one of these processings is to verify biometric data which are transmitted to the secure element.

The communication interface 12 of the secure element SE is more precisely adapted to dialog with the communication interface 10 of the micro controller unit MCU.

The secure element SE further comprises a random number generator. The random number generator is a dedicated hardware component or a sotfware program designed to be executed by the processor 14 of the secure element SE.

The secure element SE is for example a smart card.

B/ Biometric Authentication Process

A biometric authentication process of an individual executed by the authentication system 1 comprises two phases:
- a preliminary set-up phase of a secure channel C between the micro controller unit MCU and the secure element SE,
- an authentication phase, during which this secure channel C is exploited to transport data.

The preliminary phase comprises mutual authentication of the secure element SE and of the micro controller unit MCU.

Figure 2:
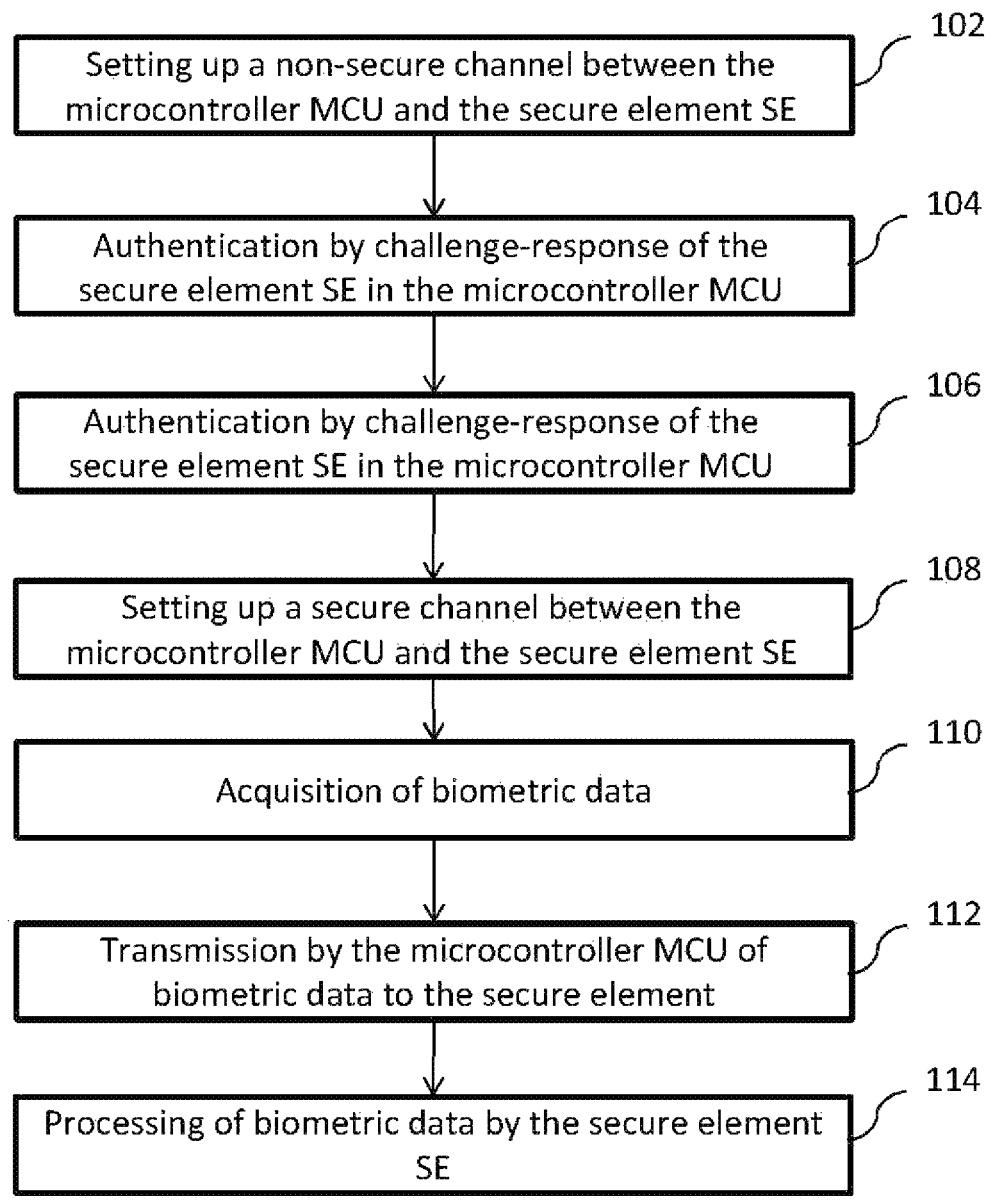
FIG. 2 is a flowchart of steps of a biometric authentication process according to an embodiment of the invention.

In reference to FIG. 2, mutual authentication comprises a step for setting up a non-secure channel C between the communication interfaces 10 and 22 according to a method known from the prior art (step 102). In the following, data communicated between the secure element SE and the micro controller unit MCU transit via this non-secure channel C, unless specified otherwise.

Mutual authentication also comprises a first challenge-response authentication of the micro controller unit MCU in the secure element SE (step 104). This first challenge-response authentication is conventional and comprises the following steps:
- the random number generator of the secure element SE generates a challenge datum,
- via its communication interface 12, the secure element SE sends the challenge datum which is specific to it to the micro controller unit MCU;
- the micro controller unit MCU generates a response datum on the challenge database which it receives and sends the response datum to the secure element SE via its communication interface 10;
- the secure element SE determines a positive or negative authentication result as a function of the received response datum, for example by verifying whether the response datum it receives is equal or not to an expected datum. If the response datum is equal to the expected datum, the result is positive and this means that the first challenge-response authentication 104 has succeeded. If not, the result is negative if the first authentication 104 fails.

The mutual authentication also comprises a second challenge-response authentication of the secure element SE in the micro controller unit MCU (step 106).

The two authentications 104 and 106 can be performed sequentially in any order or concomitantly.

Figure 3:
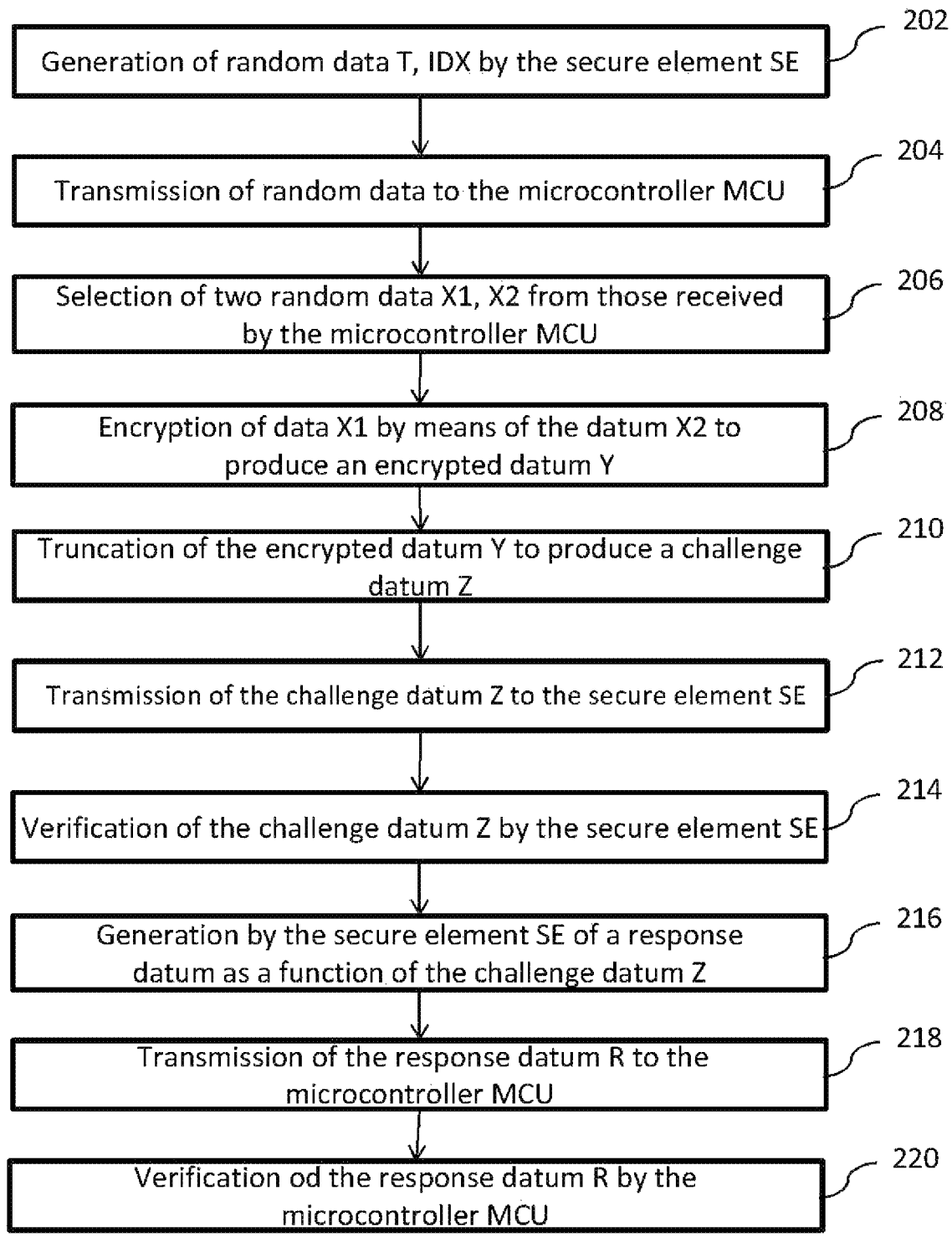
FIG. 3 is a flowchart of sub-steps of a step forming part of the process of FIG. 2.

In reference to the flowchart of FIG. 3, the second authentication 106, which is unconventional, comprises the following sub-steps.

The secure element SE generates at least one random datum (step 202), for example by means of the same random number generator as that used during step 104.

Figure 4:
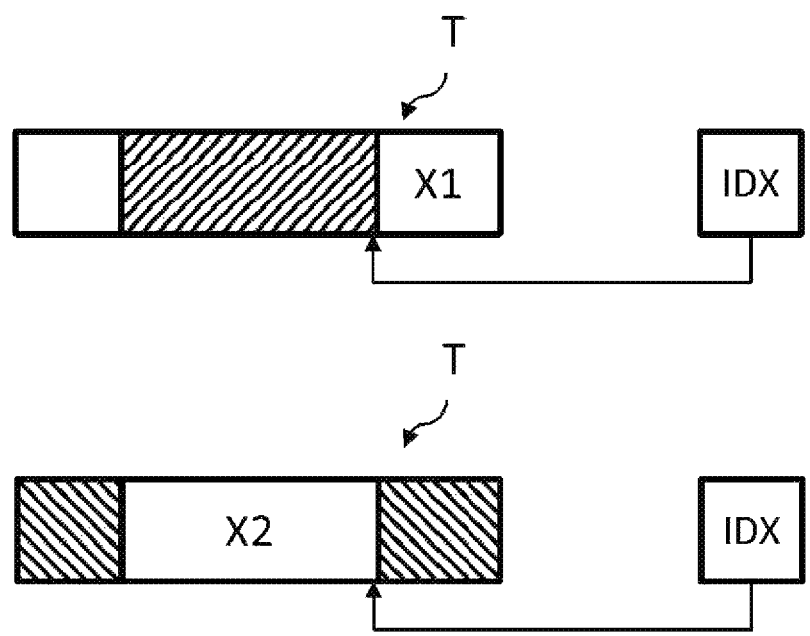
FIG. 4 illustrates two random data used during execution of the process of FIGS. 2 and 3.

In an embodiment which is taken as a non-limiting example hereinbelow, a random table T and an index datum IDX in the guise of random data are generated by the secure element SE, these random data being illustrated in FIG. 4. The index table T constitutes a set from where several data can be extracted. The index datum IDX indicates a position in the table T; the index datum IDX is for example coded on an octet.

The two random data T and IDX are generated by the random number generator of the secure element SE independently, that is, one of these data is not generated from the other datum.

The random data T, IDX are transmitted by the communication interface 12 to the micro controller unit MCU (step 204).

After they are received by the communication interface 10, the processor 8 of the micro controller unit MCU utilises the random data T, IDX generated by the secure element SE to generate a challenge datum Z specific to this micro controller unit MCU.

For this, the micro controller unit MCU selects a first random datum X1 and a second random datum X2 different to X1 in the set of random data formed by the received table T (step 206).

Preferably, this selection 206 depends on the index datum IDX previously generated randomly by the secure element so as to increase the number of possible selections and therefore the security of the generation of the challenge datum on the micro controller unit MCU side.

The first random datum X1 is for example a first part of the table T, localised by means of the index datum IDX. For example, the first part is a part of the table T of predetermined size starting at a relative address in the table T, which is indicated by the index datum IDX as shown in FIG. 4. The table T is considered as a circular buffer in the sense where the first part X1 can comprise bits at the end of the table and the beginning of the table in the event where the relative address plus the predetermined size are equal to a higher address point beyond the random table.

The micro controller unit MCU also selects as second datum X2 a second part of the table T, for example disconnected from the first part, or even complementary to it in the table T.

For example, the two parts of the table X1 and X2 each have 16 bytes when the table has 32 bytes.

The micro controller unit MCU then encrypts the first random datum X1 by using the second random datum X2 as encryption key, so as to produce an encrypted random datum Y on which the challenge datum Z (step 208) depends. The encryption algorithm used during this step 208 is for example the algorithm AES. Algorithms other than the AES can be used during step 208, however.

The encrypted random datum Y is then truncated, the challenge datum Z being the result of this truncation of the encrypted random datum Y (step 210). The truncation for example eliminates the 8 most significant bits or the 8 least significant bits of the encrypted random datum Y so as to obtain a challenge datum Z having 8 bytes.

To obtain the challenge datum Z, an attacker would need to retrieve the table T, but also the index datum IDX, and know how these data are combined to generate the datum Z, which is particularly difficult to carry out. Each of steps 208, 210 and 212 therefore contributes to increasing the level of security of the authentication 106 of the secure element in the micro controller unit.

The following steps of the second challenge-response authentication are conventional:
- the micro controller unit MCU sends its own distinctive challenge datum Z to the secure element SE (step 212) via its communication interface 10;
- the secure element SE generates a response datum R on the challenge database Z it receives (step 216) and transmits the response datum R to the micro controller unit MCU (step 218);
- the micro controller unit MCU determines a positive or negative authentication result as a function of the received response datum R (step 220), for example by verifying whether the response datum R it receives is equal or not to an expected datum. The expected datum is linked to the challenge datum by a predetermined mathematical relation. If the response datum R actually is equal to the expected datum, the result is positive, meaning that the challenge-response authentication 106 has succeeded. If not, the result is negative if the second authentication 106 fails.

In addition, the secure element SE can perform verification of integrity of the challenge datum Z it receives from the micro controller unit MCU (step 214). This verification 214 is conducted by comparing the challenge datum Z received from the micro controller unit MCU with another challenge datum generated internally by the secure element SE, by means of the same steps 208, 210, 212 as those performed by the micro controller unit MCU, the random data initially generated by the secure element SE during step 202 having been stored in the interim by the latter.

If both challenge data compared during step 214 have different values, an attack by fault injection resulting in corruption of the challenge datum Z generated by the micro controller unit MCU may have occurred: it is thus ensured that the result of the second authentication is negative. For example, the response datum R is not sent by the secure element SE to the micro controller unit MCU or a response datum R of knowingly incorrect value is sent by the secure element SE to the micro controller unit MCU to generate an error, on the micro controller unit MCU side, during verification step 220.

In the contrary case (if both challenge data compared during step 214 are identical), the challenge datum Z was generated according to the secure element SE, and a correct response datum is transmitted during step 218.

A secure channel is set up only if mutual authentication succeeded, that is, if the two challenge-response authentications 104, 106 have both succeeded.

The secure channel is for example set up in keeping with the protocol SCP02 or the protocol SCP03 defined by the GlobalPlatform association.

Once the secure channel is set up, the second phase can be executed. The second phase comprises the following steps.

Back to FIG. 2, the biometric sensor 4 acquires a biometric datum (for example, a fingerprint) (step 110).

This biometric datum is then transmitted to the micro controller unit MCU which retransmits it in the secure channel set up during the preliminary phase with the secure element SE (step 112).

The secure element SE receives the biometric datum and processes it (step 114).

This processing 114 comprises for example comparison between this biometric datum acquired and a reference datum. As a function of the result of this comparison the individual is correctly authenticated or not on the basis of the acquired biometric data.

The steps of the authentication 106 can be repeated once the secure channel between the secure element SE and the micro controller unit MCU has been set up during step 108. For example, it can be that session keys are generated during mutual authentication. With each new authentication, news session keys are generated. In this case, a new table T can be generated every 16 session keys.

In particular, the random data T, IDX can be transmitted during repeating of step 204 in the secure channel already set up. The same applies for steps 212 and 218.

The invention is not limited to the embodiments described previously. In another embodiment, the secure element does not generate an index datum. This index datum IDX is predetermined and stored in the micro controller unit MCU, or even also in the secure element if the verification step 214 of the challenge datum Z is conducted. However, the datum IDX is not transmitted via the channel C.

The invention claimed is:

1. A challenge-response authentication process of a secure element in a micro controller unit devoid of a random number generator, the process comprising the following steps conducted by the micro controller unit:
   - receiving at least one random datum generated randomly by the secure element, wherein said at least one random datum comprises a set of random data,
   - generating a challenge datum specific to the micro controller unit from the received random datum, wherein generating the challenge datum comprises:
     - selecting a first random datum and a second random datum data in the set of random data, and
     - encrypting the first random datum by using the second random datum as an encryption key so as to produce an encrypted random datum, wherein the challenge datum depends on the encrypted random datum,
   - sending the generated challenge datum to the secure element,
   - receiving a response datum generated by the secure element from the challenge datum,
   - determining an authentication result as a function of the received response datum.

2. The process according to claim 1, wherein the set of random data comprises a table and an index datum associated with the table, and selecting the first random datum in the set of random data comprises locating the first random datum in the table using the index datum.

3. The process according to claim 2, wherein the second random datum is a complement of the first random datum in the table.

4. The process according to claim 1, wherein generating the challenge datum also comprises truncating the encrypted random datum.

5. A challenge-response authentication process of a secure element in a micro controller unit devoid of a random number generator, the process comprising the following steps conducted by the secure element:
   - randomly generating at least one random datum, wherein said at least one random datum comprises a set of random data,
   - sending the random datum to the micro controller unit,
   - receiving a challenge datum specific to the micro controller unit and generated by the micro controller unit from the random datum sent,
   - generating a response datum from the received challenge datum, sending of the response datum to the micro controller unit in order to determine an authentication result as a function of the response datum sent,
wherein generating the challenge datum comprises:
selecting a first random datum and a second random datum data in the set of random data, and
encrypting the first random datum by using the second random datum as an encryption key so as to produce an encrypted random datum, wherein the challenge datum depends on the encrypted random datum.

6. The process according to claim 5, further comprising:
generating at the secure element another challenge datum from the generated random datum,
comparing the challenge datum received by the secure element and the other challenge datum generated by the secure element,
executing a security measure adapted so that the authentication result is negative when the compared challenge data are different.

7. The process according to claim 1, wherein the secure element is a smart card or wherein the micro controller unit is a transmission interface of biometric data previously acquired by a biometric sensor to the secure element.

8. A micro controller unit devoid of a random number generator, wherein the micro controller unit comprises a communication interface with a secure element, and further comprises at least one processor configured, during an authentication of the secure element by challenge-response in the micro controller unit, to:
receive, via the communication interface, at least one random datum generated randomly by the secure element, wherein said at least one random datum comprises a set of random data,
generate a challenge datum specific to the micro controller unit from the received random datum,
control sending by the communication interface of the generated challenge datum to the secure element,
receive, via the communication interface, a response datum generated by the secure element from the challenge datum,
determine an authentication result as a function of the received response datum,
wherein generating the challenge datum comprises:
selecting a first random datum and a second random datum data in the set of random data, and
encrypting the first random datum by using the second random datum as an encryption key so as to produce an encrypted random datum, wherein the challenge datum depends on the encrypted random datum.

9. A secure element comprising a communication interface with a micro controller unit devoid of a random number generator, wherein the secure element comprises at least one processor configured, during an authentication of the secure element by challenge-response in the micro controller unit, to:
randomly generate at least one random datum, wherein said at least one random datum comprises a set of random data,
control sending of the random datum to the micro controller unit by the communication interface,
receive a challenge datum specific to the micro controller unit and generated by the micro controller unit from the sent random datum,
generate a response datum from the received challenge datum,
control sending by the communication interface of the response datum to the micro controller unit in order to determine an authentication result as a function of the sent response datum,
wherein venerating the challenge datum comprises:
selecting a first random datum and a second random datum data in the set of random data, and
encrypting the first random datum by using the second random datum as an encryption key so as to produce an encrypted random datum, wherein the challenge datum depends on the encrypted random datum.

10. A non-transitory computer-readable medium comprising code instructions for causing a micro controller unit devoid of a random number generator to perform a challenge-response authentication process of a secure element in the micro controller unit, the process comprising:
receiving at least one random datum generated randomly by the secure element, wherein said at least one random datum comprises a set of random data,
generating a challenge datum specific to the micro controller unit from the received random datum,
sending the generated challenge datum to the secure element,
receipt of a response datum generated by the secure element from the challenge datum,
determining an authentication result as a function of the received response datum,
wherein generating the challenge datum comprises:
selecting a first random datum and a second random datum data in the set of random data, and
encrypting the first random datum by using the second random datum as an encryption key so as to produce an encrypted random datum, wherein the challenge datum depends on the encrypted random datum.

11. A non-transitory computer-readable medium comprising code instructions for causing a secure element to perform a challenge-response authentication process of a secure element in a micro controller unit devoid of a random number generator, the process comprising:
randomly generating at least one random datum, wherein said at least one random datum comprises a set of random data,
sending the random datum to the micro controller unit,
receiving a challenge datum specific to the micro controller unit and generated by the micro controller unit from the random datum sent,
generating a response datum from the received challenge datum,
sending of the response datum to the micro controller unit in order to determine an authentication result as a function of the response datum sent,
wherein generating the challenge datum comprises:
selecting a first random datum and a second random datum data in the set of random data, and
encrypting the first random datum by using the second random datum as an encryption key so as to produce an encrypted random datum, wherein the challenge datum depends on the encrypted random datum.

* * * * *